United States Patent [19]
Mizumoto et al.

[11] Patent Number: 5,189,916
[45] Date of Patent: Mar. 2, 1993

[54] PRESSURE SENSOR

[75] Inventors: Katsuyoshi Mizumoto; Kanehisa Kitsukawa; Toshikatsu Yasuda; Takao Kojima, all of Aichi, Japan

[73] Assignee: NGK Spark Plug Co., Ltd., Aichi, Japan

[21] Appl. No.: 743,781

[22] Filed: Aug. 12, 1991

[30] Foreign Application Priority Data

Aug. 24, 1990 [JP] Japan .................................. 2-221370
Oct. 31, 1990 [JP] Japan .................................. 2-292093

[51] Int. Cl.[5] .......................... G01L 7/08; G01L 9/12
[52] U.S. Cl. ...................................... 73/724; 73/718; 361/283
[58] Field of Search ................. 73/718, 719, 720, 721, 73/722, 723, 724, 725, 726, 727, 728, 729, 708, 706; 92/103 M, 103 R; 338/4, 42; 361/283; 336/30

[56] References Cited
U.S. PATENT DOCUMENTS 5,027,652  7/1991  Goebel et al. ................... 73/204.26

FOREIGN PATENT DOCUMENTS 58-80540    5/1983   Japan .
59-42938    3/1984   Japan .
59-148843   8/1984   Japan .
59-214727  12/1984   Japan .
60-51444    4/1985   Japan .
63-9174     2/1988   Japan .
63-292032  11/1988   Japan .

Primary Examiner—Donald O. Woodiel
Attorney, Agent, or Firm—Finnegan, Henderson, Farabow, Garrett and Dunner

[57] ABSTRACT

A pressure sensor having a ceramic substrate formed from a first unsintered ceramic material, and a diaphragm capable of deformation under pressure, and formed of a second unsintered ceramic material having a factor of shrinkage upon sintering smaller than that of the first material. The diaphragm is fixed to the periphery of a surface of the ceramic substrate to form an integral assembly having a hollow space formed therebetween upon sintering due to the difference in the factor of shrinkage of the first and second materials.

25 Claims, 10 Drawing Sheets

PRESSURE SENSOR

BACKGROUND OF THE INVENTION

1. Field of the Invention

The present invention relates to pressure sensors. More particularly, the present invention concerns pressure sensors made of ceramic materials.

2. Discussion of the Related Art

Two types of ceramic pressure sensors are conventionally known, an electrostatic capacitive type and a variable resistance type. In the first type of pressure sensor, an electrode is formed on each of a diaphragm and a substrate. Upon application of pressure, the diaphragm is deformed to cause a change in the electrostatic capacitance between the electrodes. The measured pressure is then determined based upon a correlation between pressure and electrostatic capacitance.

Figure 21:
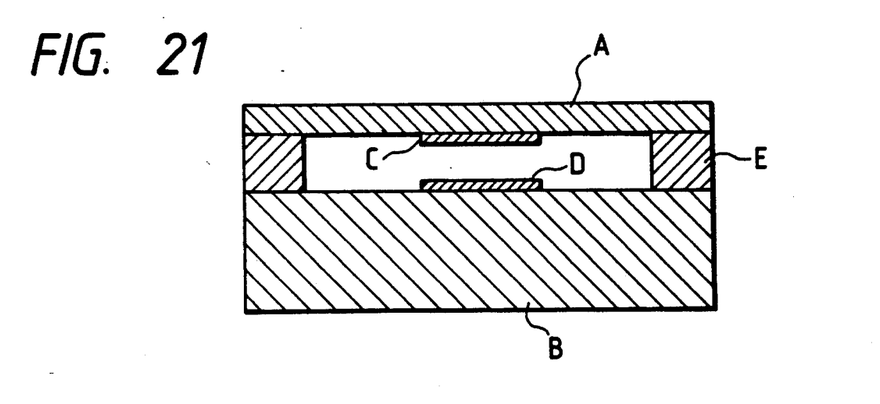
FIG. 21 is a schematic cross-sectional view of a prior art pressure sensor of an electrostatic capacitive type.

Specific examples of this type of pressure sensor are described in Japanese Patent Unexamined Publication Nos. Sho 59-214727 and Sho. 59-148843. As shown in FIG. 21, these sensors comprise a ceramic diaphragm A and a ceramic substrate B, with thin-film electrodes C and D being formed on the opposing faces of the ceramic diaphragm A and the ceramic substrate B. The periphery of the ceramic diaphragm A is bonded to the ceramic substrate B by a glass spacer E so that the ceramic diaphragm A and the ceramic substrate B are spaced apart by a specified distance.

The pressure sensor having the construction described above is used such that the pressure to be measured will act on the outer surface of the ceramic diaphragm A. When the pressure is exerted, the ceramic diaphragm A deforms and, as a result, the electrode C formed on the inner surface of the ceramic diaphragm A is displaced with respect to the electrode D formed on the ceramic substrate B. Thus, the capacitance between the electrodes C and D changes by an amount sufficient to detect and measure the change in pressure.

Examples of prior art electrostatic capacitive pressure sensors having similar constructions are described in Japanese Utility Model Unexamined Publication Nos. Sho. 58-80540, Sho. 59-42938 and Sho. 60-51444.

A pressure sensor of the variable resistance type includes a resistor formed on a diaphragm which has a resistance value which varies in response to the deformation of the diaphragm when subjected to pressure changes. The pressure is measured based on the change of resistance of the resistor.

To manufacture the conventional ceramic pressure sensors, separately shaped and sintered diaphragms and substrates are bonded by an adhesive material such as glass. However, due to a thermal expansion mismatch between the adhesive, and the diaphragm or substrate, the strength of the adhesive will decrease as a result of repeated pressure measurements, and thus, the pressure resistance of the sensor deteriorates.

The thermal expansion mismatch between the adhesive, and the diaphragm or substrate presents another problem when the pressure sensor is used in a relatively hot atmosphere. For example, the diaphragm may deform, and thus cause detection errors, even when no additional pressure is actually being exerted on the diaphragm.

With a view to solving these problems, it has been proposed in Japanese Patent Unexamined Publication No. Sho. 63-292032 and Japanese Patent Examined Publication No. Sho. 63-9174, that the diaphragm and the substrate be assembled with an insert between the diaphragm and the substrate, which is formed of a material sublimable in the heat produced during the sintering of the assembly in order to form a predetermined space between the diaphragm and the substrate.

The problem with this approach is that the insert material is fairly expensive. In addition, the insert material must be shaped in conformance with the dimensions of the space to be formed prior to sintering. Further, when the diaphragm and the substrate are assembled by sintering, heating is necessary for a relatively long time in order to completely sublime the insert. Because of these difficulties, the manufacturing process is both complicated and expensive.

SUMMARY OF THE INVENTION

The present invention has been made in view of the above circumstances and has as an object to provide a pressure sensor that can be manufactured by a simplified process at a substantially reduced cost.

A further object of the present invention is to provide a pressure sensor which uses existing ceramic materials and to easily form a hollow space of desired dimensions in between the substrate and the diaphragm.

To achieve the objects and in accordance with the purpose of the invention, as embodied and broadly described herein, the pressure sensor of this invention comprises a ceramic substrate formed from a first unsintered ceramic material, and a diaphragm capable of deformation under pressure, and formed of a second unsintered ceramic material having a factor of shrinkage upon sintering smaller than that of the first material, wherein the diaphragm is fixed to the periphery of a surface of said ceramic substrate to form an integral assembly having a hollow space formed therebetween upon sintering due to the difference in the factor of shrinkage of the first and second materials.

A pressure sensing element provided on a pressure sensor of an electrostatic capacitive type includes a pair of electrodes provided on the diaphragm and the substrate such that the electrodes are separated by the hollow space between the diaphragm and the substrate. On the other hand, a pressure sensing element provided on a pressure sensor of a variable resistance type, includes a resistor formed on the outer surface of the diaphragm. In whichever case, the pressure sensing element is provided on an unsintered ceramic material, and the diaphragm and the substrate are integrally assembled by sintering to insure strong adhesion between the ceramic material and the pressure sensing element. It should, however, be noted that if the pressure sensing element is a resistor, it is preferably attached after sintering the integral assembly of the diaphragm and the substrate in order to avoid oxidation of the resistor during sintering.

In producing the pressure sensor of the present invention having the construction described above, the diaphragm made of an unsintered ceramic material and the substrate which is also made of an unsintered ceramic material, are sintered simultaneously so that they are integrally joined in their peripheral portions within a relatively short time. If, prior to sintering, an unsintered ceramic paste is applied between the diaphragm and the substrate in the peripheral portions, or if the diaphragm and the substrate are thermocompressed to have their peripheral portions bonded temporarily, better adhesion is achieved. Furthermore, upon sintering, the diaphragm and the substrate are formed into a single structure to provide a joint between the diaphragm and the substrate having sufficient strength and durability to withstand thermal expansion. As a result, a decrease in pressure resistance of the pressure sensor, and deformation resulting from elevated temperature while in the absence of exerted pressure can be avoided to eliminate detection errors.

In accordance with the present invention, the diaphragm is made of an unsintered ceramic material having a predetermined factor of shrinkage whereas the substrate is made of unsintered ceramic material having a larger factor of shrinkage. In the process of sintering simultaneously each of the diaphragm and the substrate, the stress of the shrinking substrate causes the diaphragm to bulge out in a central portion, thereby forming a desired hollow space between the diaphragm and the substrate. The factor of shrinkage is expressed by the following:

$$\frac{\text{length before sintering} - \text{length after sintering}}{\text{length before sintering}} \times 100$$

Thus, by selecting appropriate dimensions for the diaphragm and the substrate, the factor of shrinkage, and the size of the hollow space to be formed, can be controlled.

The factor of shrinkage can also be easily controlled by adjusting the particle size of ceramic powders or their density. The smaller the particle size or density of ceramic powders, the greater the factor of shrinkage.

Hence, a hollow space having the desired dimensions can be formed between the diaphragm and the substrate without using inserts which are expensive and which need be shaped to predetermined desired dimensions.

If desired, a protective layer can be provided on the diaphragm to insure prolonged and consistent operation of the pressure sensing element by protecting it against deterioration by contaminants.

In producing the pressure sensor of the present invention having the construction described above, the diaphragm and/or the substrate may be overlaid with at least one thick ceramic layer having a different factor of shrinkage upon sintering. Thus, an assembly may be provided which has a factor of overall shrinkage upon sintering that is in between those of the diaphragm and the substrate. Hence, there is no need to develop individual ceramic materials in strict compliance with the factor of shrinkage required for a specific application and, instead, ceramic layers having known factors of shrinkage upon sintering may be superposed one on another to produce an assembly having a factor of shrinkage between those of the diaphragm and the substrate. As a result, fine adjustments of the shrinkage factor can be made for both the diaphragm and the substrate, and a hollow space of the desired size can be easily formed.

A further advantage of providing the thick ceramic layer is that unsintered ceramics can be finely adjusted to have factors of shrinkage that are appropriate for the diaphragm and the substrate.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Figure 1:
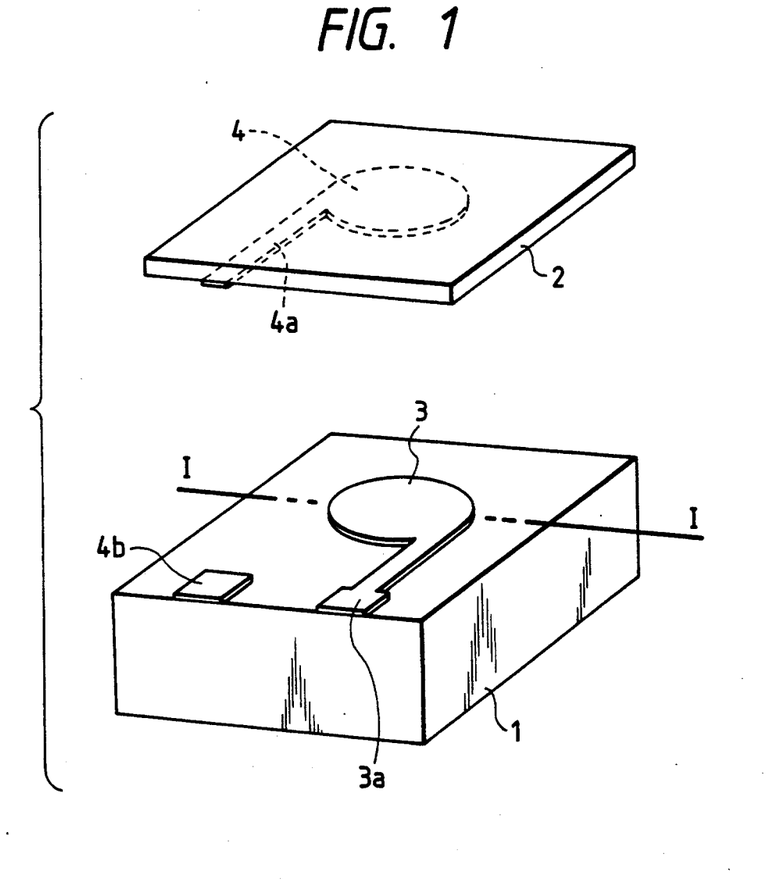
FIG. 1 is a perspective view showing a pressure sensor according to a first embodiment of the present invention in an unassembled state.
Figure 2:
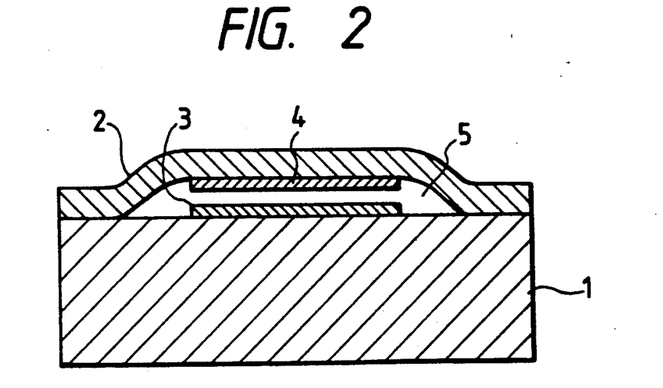
FIG. 2 is an enlarged cross section of FIG. 1, taken on line I—I, which shows the pressure sensor in an assembled state.

A pressure sensor according to a first embodiment of the present invention is shown in FIGS. 1 and 2. The pressure sensor comprises a substrate 1 made of a green sheet having a thickness of 0.80 mm and formed of a material including $Al_2O_3$ and having a purity of 92% and such a composition as to experience 16.7% shrinkage upon sintering. The pressure sensor further comprises a diaphragm 2 made of a green sheet having a thickness of 0.10 mm that is formed of the same ceramic material as the substrate 1 except that it will shrink by a smaller factor of 15.3%. Circular Pt electrodes 3 and 4 which form a pressure sensing element are formed by screen printing on the upper surface of the substrate 1 and on the lower surface of the diaphragm 2, respectively. As shown in FIG. 1, leads 3a and 4a extend from the circular electrodes 3 and 4, respectively, toward one side of the sensor. A lead 4b is also formed on the substrate 1 such that it is coupled to the lead 4a of the electrode 4 on the diaphragm 2 when the diaphragm 2 is superposed on the substrate 1.

Subsequently, an unsintered ceramic paste made of the same material as the substrate 1, and having an organic binder added thereto, is formed by screen printing on the substrate 1 in all areas of the substrate 1 except that in which the circular electrode 4 is formed, and preferably in areas of the substrate 1 which circumscribe of the electrode 4. The paste is applied to form a layer having a thickness of 20 μm.

Before the printed ceramic paste dries up, the diaphragm 2 is placed on top of the substrate 1 such that the electrodes 3 and 4 will face each other. The assembly is then heated at 250° C. to remove the resin content and is later sintered at a temperature of 1550° C. in an ambient atmosphere. As a result, a hollow space 5 is formed between the electrodes 3 and 4 (see the cross section of FIG. 2) due to the difference in shrinkage between the substrate 1 and the diaphragm 2 which are firmly bonded in their peripheral portions.

Figure 3:
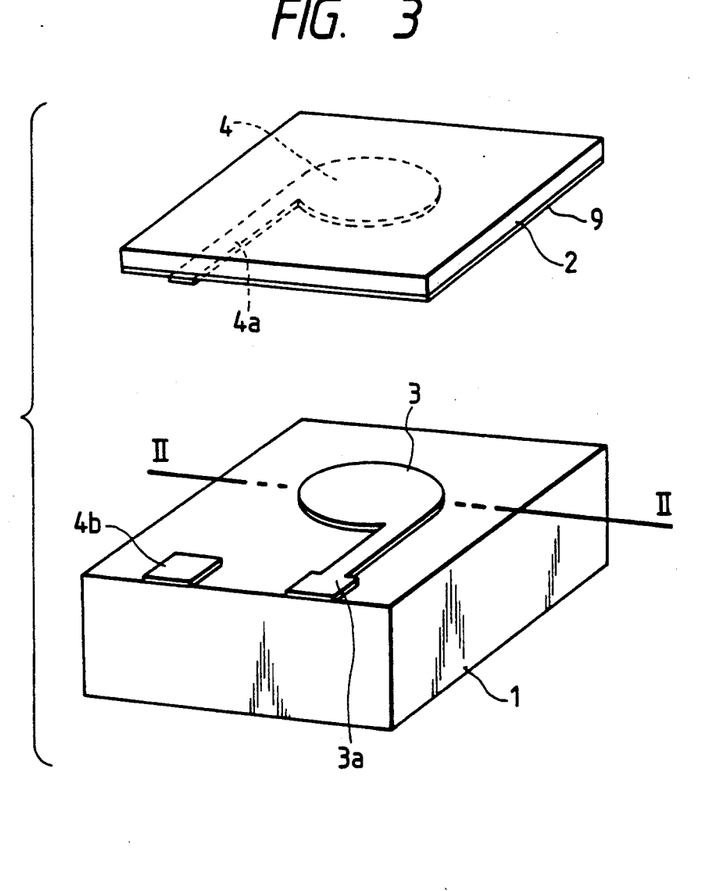
FIG. 3 is a perspective view showing a pressure sensor according to a second embodiment of the present invention in an unassembled state.
Figure 4:
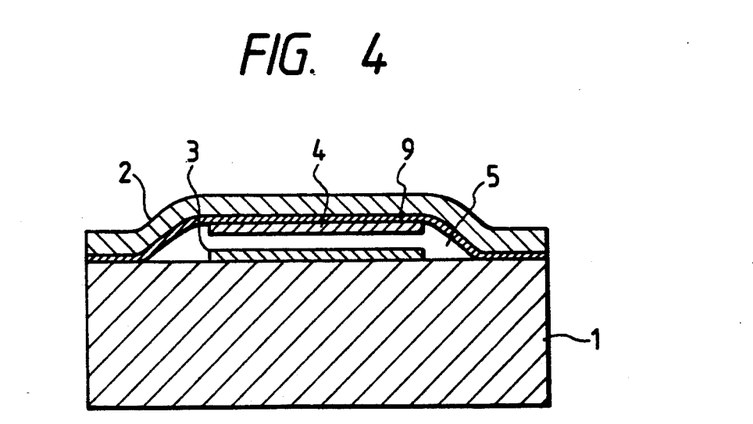
FIG. 4 is an enlarged cross section of FIG. 3, taken on line II—II which shows the pressure sensor in an assembled state.

A pressure sensor according to a second embodiment of the present invention is shown in FIGS. 3 and 4 in which the components that are the same as those shown in FIGS. 1 and 2 are identified by like numerals. In this second embodiment, a thick layer 9 is formed on the lower surface of the diaphragm 2 by screen printing a ceramic-containing paste having a thickness of 30 μm. The paste is composed of an unsintered ceramic material and an organic binder which will shrink by 16% upon sintering. Circular Pt electrodes 3 and 4 which form a pressure sensing element are formed having a thickness of 15 μm by screen printing on the upper surface of the substrate 1 and on the lower surface of the thick layer 9, respectively.

Subsequently, an unsintered ceramic paste that is made of the same material as the substrate 1 and that has an organic binder added thereto is printed by screen printing having a thickness of 30 μm on the substrate 1 in all areas of the substrate 1 except that in which the circular electrode 4 is provided, preferably in areas of the substrate 1 which circumscribe the electrode 4.

Before the printed ceramic paste dries up, the diaphragm 2 is placed on top of the substrate 1 such that the electrodes 3 and 4 will face each other. The assembly is then heated at 250° C. to remove the resin content and is later sintered at a temperature of 1550° C. in an ambient atmosphere. As a result, a hollow space 5 is formed between the electrodes 3 and 4 (see the cross section of FIG. 4) due to the difference in shrinkage between the substrate 1 and the diaphragm 2 which are firmly bonded in their peripheral portions. In this instance, the thick layer 9 controls the shrinkage of the diaphragm 2 during sintering to insure that the hollow space 5 formed between the substrate 1 and the diaphragm 2 will have the desired dimensions.

Figure 5:
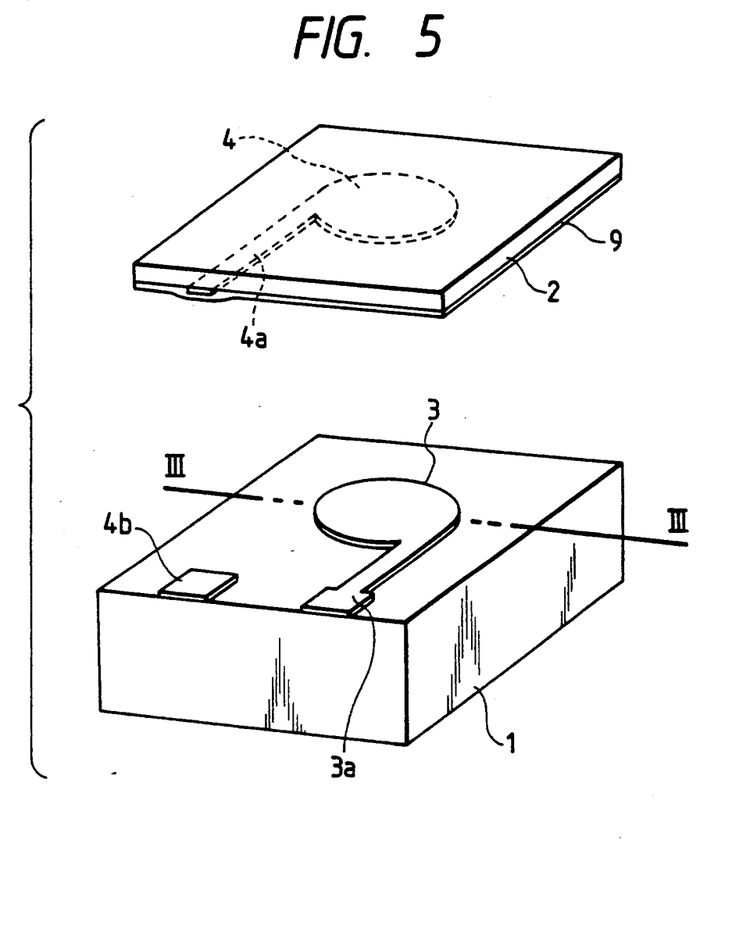
FIG. 5 is a perspective view showing a pressure sensor according to a third embodiment of the present invention in an unassembled state.
Figure 6:
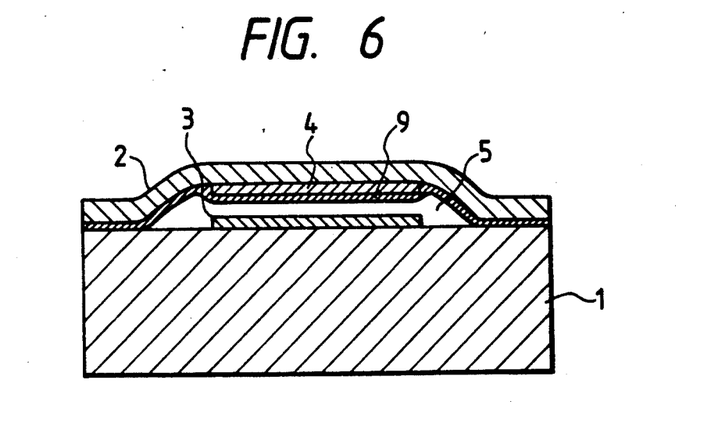
FIG. 6 is an enlarged cross section of FIG. 5, taken on line III—III, which shows the pressure sensor in an assembled state.

A pressure sensor according to a third embodiment of the present invention is shown in FIGS. 5 and 6, in which the components that are the same as those shown in FIGS. 1-4 are identified by like numerals. In this third embodiment, the electrode 4 is formed on the lower surface of the diaphragm 2 and the thick ceramic layer 9 is formed to cover the electrode 4 and the other areas of the lower surface of the diaphragm 2. The other aspects of the construction and the process of fabrication are essentially the same as in the second embodiment shown in FIGS. 3 and 4.

Figure 7:
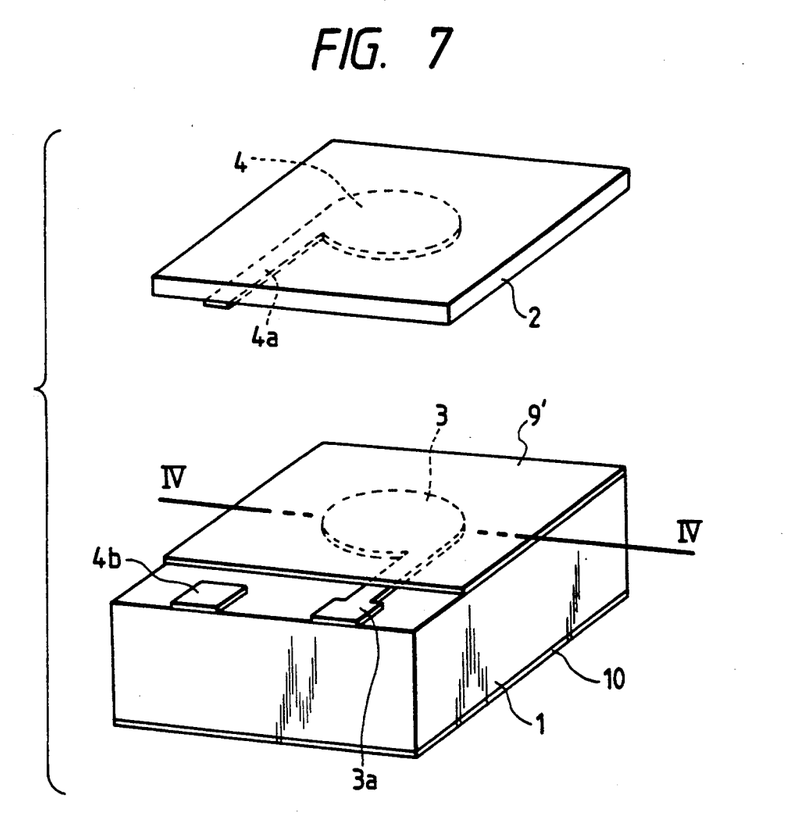
FIG. 7 is a perspective view showing a pressure sensor according to a fourth embodiment of the present invention in an unassembled state.
Figure 8:
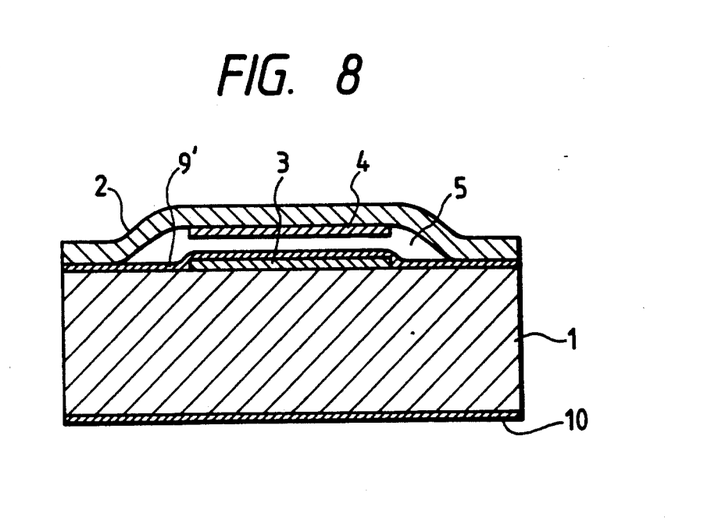
FIG. 8 is an enlarged cross section on FIG. 7, taken on line IV—IV, which shows the pressure sensor in an assembled state.

A pressure sensor according to a fourth embodiment of the present invention is shown in FIGS. 7 and 8, in which the components that are the same as those shown in FIGS. 1-6 are identified by like numerals. In this embodiment, a thick layer 9' is formed on the surface of the substrate 1 as a green sheet having a thickness of 50 μm that will shrink by 16% during sintering. The electrode 3 is formed as an intermediate layer between the thick layer 9' and the substrate 1 in a position that corresponds to the electrode 4 on the diaphragm 2. The thick layer 9' controls the shrinkage of the substrate 1 during sintering to insure that the hollow space 5 formed between the substrate 1 and the diaphragm 2 will have the desired dimensions. In this fourth embodiment, a thick ceramic layer 10 is formed on the back surface of the substrate 1 in order to prevent warpage which would otherwise occur after sintering. Such an anti-warpage layer may also be provided in the three embodiments already described above with reference to FIGS. 1-6.

Figure 9:
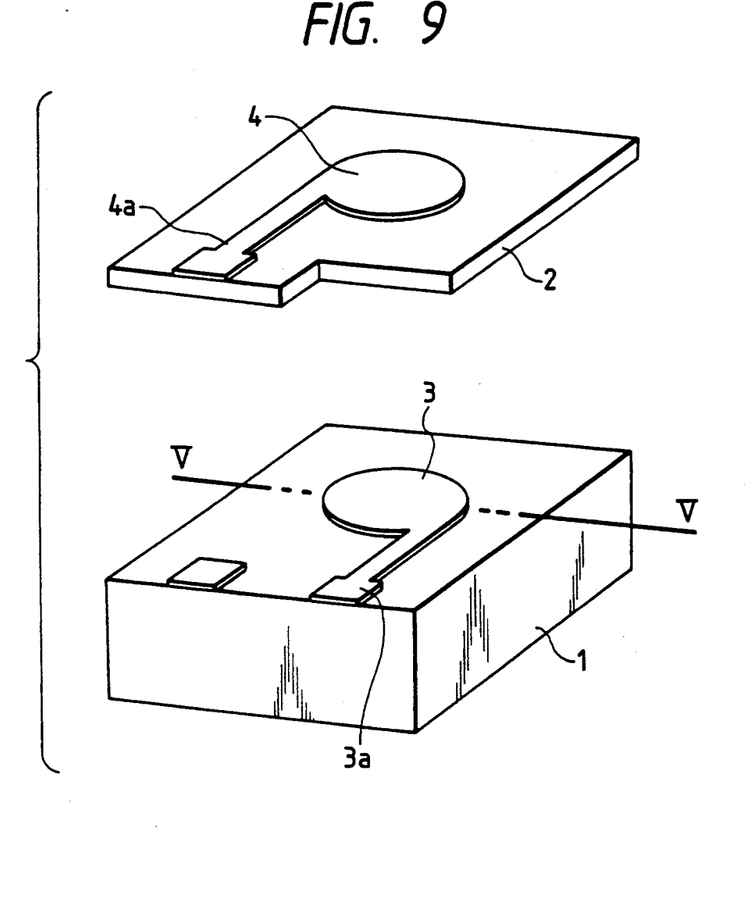
FIG. 9 is a perspective view showing a pressure sensor according to a fifth embodiment of the present invention in an unassembled state.
Figure 10:
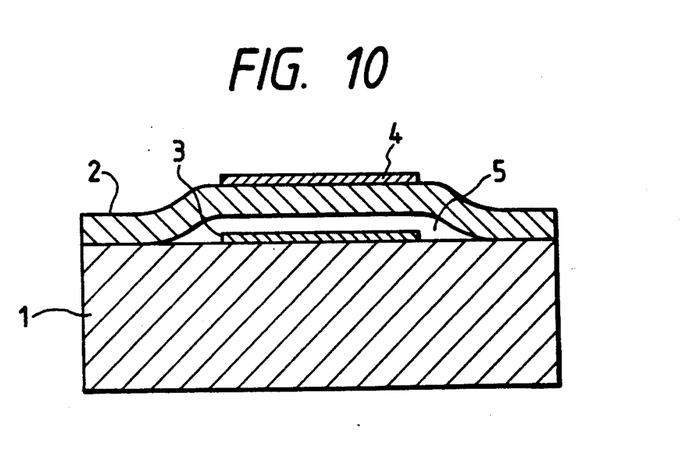
FIG. 10 is an enlarged cross section of FIG. 9, taken on line V—V, which shows the pressure sensor in an assembled state.

A pressure sensor according to a fifth embodiment of the present invention is shown in FIGS. 9 and 10, in which the components that are the same as those shown in FIGS. 1-8 are identified by like numerals. In this fifth embodiment, the electrode 4 is also formed on the diaphragm 2 in a position that corresponds to the electrode 3 on the substrate 1. However, unlike the previously described embodiments, the electrode 4 is provided on the outer surface, not the inner surface, of the diaphragm 2. The other aspects of the construction and the process of fabrication are essentially the same as in the first embodiment shown in FIGS. 1 and 2.

Figure 11:
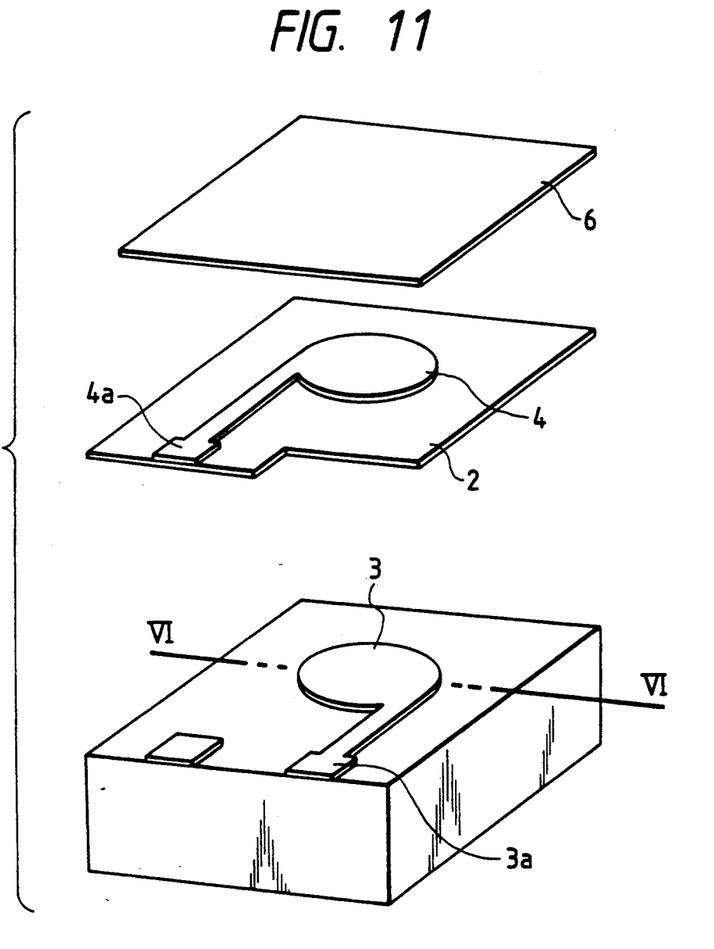
FIG. 11 is a perspective view showing a pressure sensor according to a sixth embodiment of the present invention in an unassembled state.
Figure 12:
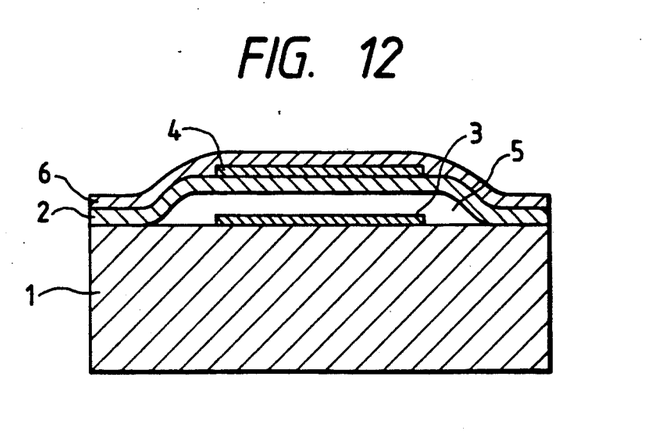
FIG. 12 is an enlarged cross section of FIG. 11, taken on line VI—VI, which shows the pressure sensor in an assembled state.

A pressure sensor according to a sixth embodiment of the present invention is shown in FIGS. 11 and 12, in which the components that are the same as those shown in FIGS. 1-10 are identified by like numerals. In this sixth embodiment, the diaphragm 2 is formed having a thickness of 50 μm. The sixth embodiment is the same as the fifth embodiment shown in FIGS. 9 and 10 in that the electrode 4 is formed on the outer surface of the diaphragm 2 in such a position that the electrode 4 corresponds to the electrode 3 on the substrate 1 when overlaid with the diaphragm 2. Further, a protective layer 6 that is made of the same material as the diaphragm 2 is formed having a thickness of 50 μm over the diaphragm 2 in order to prevent the electrode 4 from being deteriorated by contaminants. To insure the necessary strength, the protective layer 6 is sintered as an integral part of the assembly of the substrate 1 and the diaphragm 2.

Figure 13:
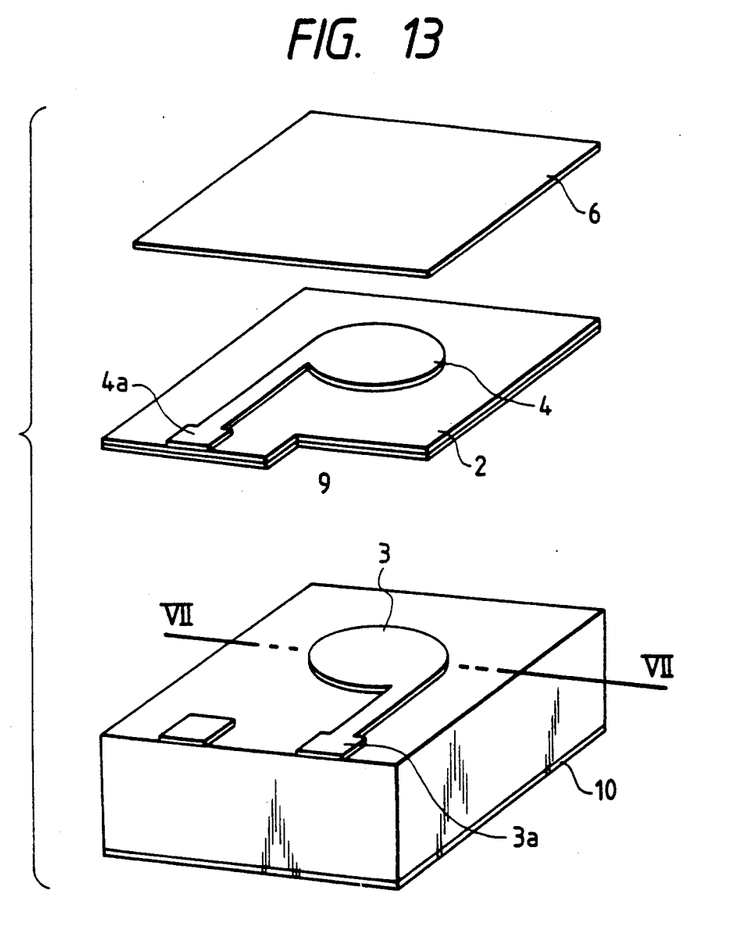
FIG. 13 is a perspective view showing in an unassembled state a pressure sensor according to a seventh embodiment of the present invention which is provided with a protective layer.
Figure 14:
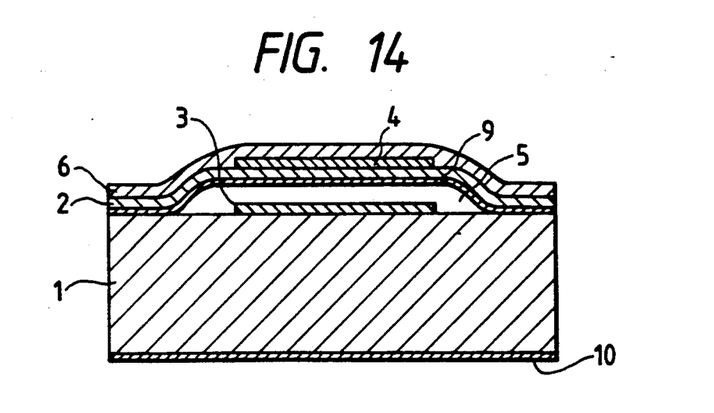
FIG. 14 is an enlarged cross section of FIG. 13, taken on line VII—VII, which shows the pressure sensor in an assembled state.

FIGS. 13 and 14 show a seventh embodiment of the present invention in which electrode 4 is provided on the outer surface of the diaphragm 2, and a protective layer 6 made of the same material as the diaphragm 2 is provided to cover the electrode 4 as well as the other areas of the diaphragm. In this seventh embodiment, the diaphragm 2 is formed having a thickness of 50 μm and, as in the second embodiment shown in FIGS. 3 and 4, the thick ceramic layer 9 is formed on the lower surface of the diaphragm 2.

As already mentioned, the hollow space to be formed between the substrate 1 and the diaphragm 2 by sintering in each of the embodiments described above, can be formed having desired dimensions by properly selecting the composition, i.e., the density and particle size, of the unsintered ceramic material used to form the substrate 1 and the diaphragm 2. The same results can also be attained by providing a thick ceramic film having a factor of shrinkage upon sintering that is in between those of the substrate 1 and the diaphragm 2.

In the case that the thick layer 9 is formed on the lower surface of the diaphragm 2 as shown in FIGS. 5 and 6, or in the case that the thick layer 9' is formed on the upper surface of the substrate 1 as shown in FIGS. 7 and 8, since these thick layers 9 and 9' covers either one of the electrodes 3 and 4 in electric insulation, when the diaphragm is deformed by a pressure, the shortcircuit between the electrodes 3 and 4 is prevented.

Further, even in the case that the electrode 4 is formed on the outer surface of the insulating diaphragm 2 as shown in FIGS. 9 and 10, the electrode 4 is protected by the electric insulation of the diaphragm so that the short circuit between the electrodes and 4 is prevented.

To test the structural strength of the pressure sensors of the present invention and a sensor of the conventional type shown in FIG. 21, the sensors were subjected to 1,000 heat cycles. Each cycle consisting of heating at 600° C. for 10 minutes in an electric furnace and holding at room temperature for 10 minutes. At 200 cycles, cracks developed in the glass spacers E at the joint between the substrate B and the diaphragm A of the prior art sensor. The sensor of the present invention could withstand 1000 cycles without any noticeable changes.

Seven embodiments of the present invention have been described above with reference to a variable capacitance pressure sensor which provides an electrode on each of the substrate and the diaphragm as a pressure sensing element, and which detects applied pressure as a change in the capacitance between the electrodes. Alternatively, a resistor may be formed as the sole pressure sensing element on the diaphragm so that applied pressure is detected as a change in the resistance value of that resistor. Embodiments of this variable resistance pressure sensor are shown in FIGS. 15-20, in which the components which are the same as those used in the embodiments shown in FIGS. 1-14 are identified by like numerals.

Figure 15:
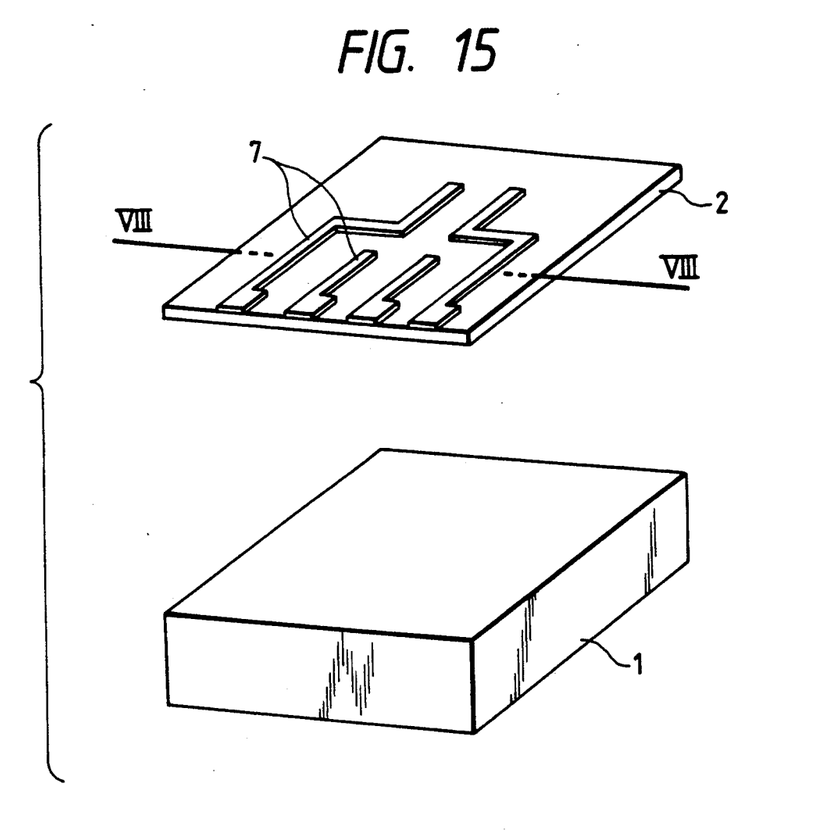
FIG. 15 is a perspective view showing in an unassembled state a pressure sensor according to an eighth embodiment of the present invention which uses a resistor as a sensing element.
Figure 16:
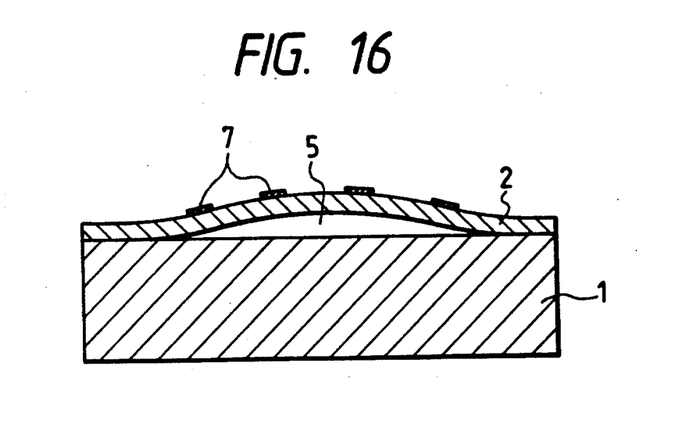
FIG. 16 is an enlarged cross section of FIG. 15, taken on line VIII—VIII, which shows the pressure sensor in an assembled state.
Figure 17:
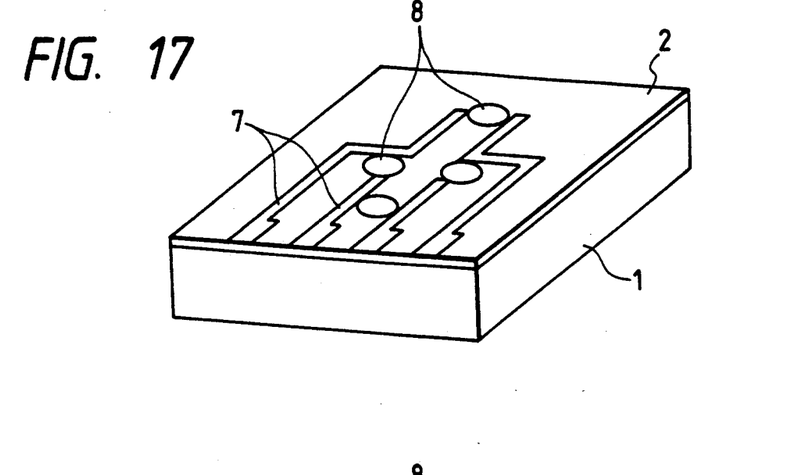
FIG. 17 is a schematic perspective view of a completed sensor with the resistors mounted thereon according to the eighth embodiment of the present invention.

As shown in FIG. 15, conductor lead layers 7 are formed on the diaphragm 2 by screen printing a paste that has an organic binder added to a noble metal (Pt) powder containing 10 wt% of the same ceramic material as the substrate 1. Subsequently, an unsintered ceramic paste containing an organic binder is provided on the peripheral portion of the substrate 1. Next, the diaphragm 2 is superposed on the substrate 1. Then, after removing the resin content at an elevated temperature, the substrate 1 and the diaphragm 2 are integrally assembled by sintering, as shown in FIG. 16. After producing the sintered assembly, resistors 8, which are primarily made of ruthenium oxide, are formed having a thickness of 5 μm by pattern transfer on the surface of the sintered assembly in selected positions between conductor lead layers 7 as shown in FIG. 17. The resistors 8 are then baked at 850° C.

Figure 18:
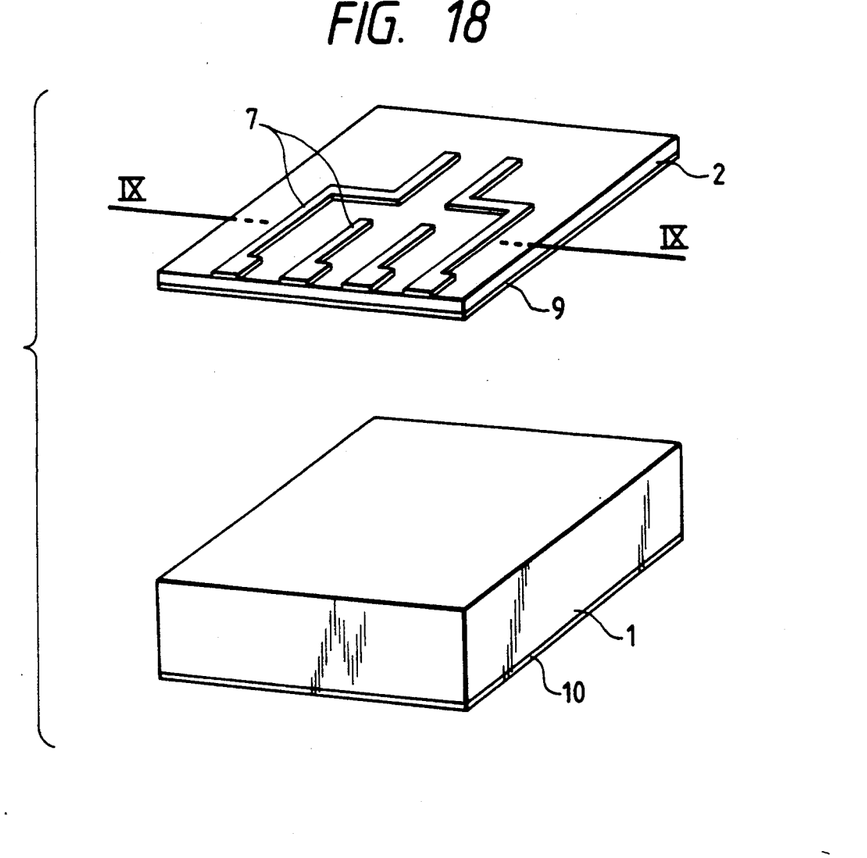
FIG. 18 is a perspective view showing in an unassembled state a pressure sensor according to a ninth embodiment of the present invention which uses a resistor as a sensing element.
Figure 19:
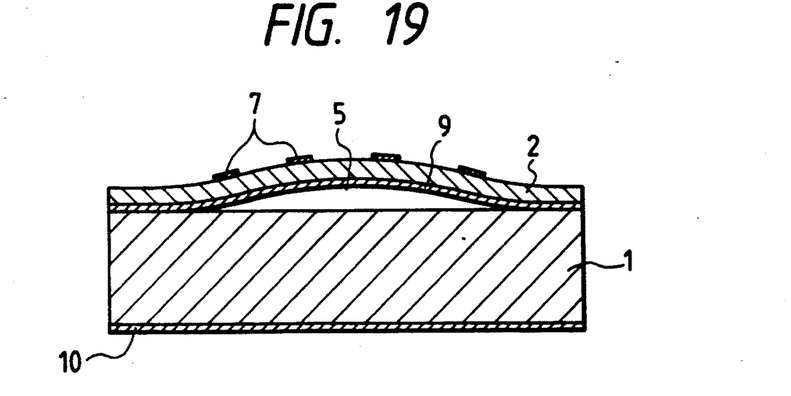
FIG. 19 is an enlarged cross section of FIG. 18 taken on line IX—IX, which shows the pressure sensor in an assembled state.
Figure 20:
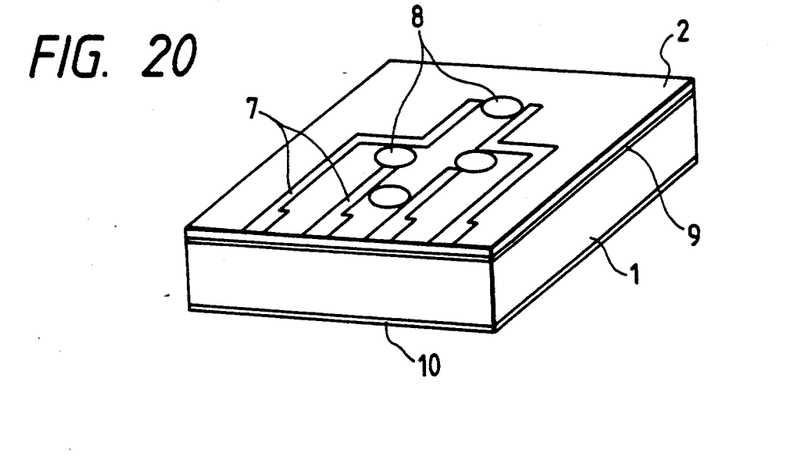
FIG. 20 is an schematic perspective view of a completed sensor with the resistors mounted thereon according to the ninth embodiment of the present invention.

As shown in FIG. 18, conductor lead layers 7 are formed on the diaphragm 2 by screen printing a paste that has an organic binder added to a noble metal (Pt) powder containing 10 wt% of the same ceramic material as the substrate 1. A thick ceramic layer 9 that serves to control the degree of shrinkage during sintering is formed on the lower surface of the diaphragm 2 by screen printing a paste having a thickness of 30 μm. The paste is composed of an unsintered ceramic material and an organic binder and will shrink by 16% during sintering. As in the embodiment shown in FIGS. 13 and 14, an anti-warpage thick ceramic layer 10 is formed on the back side of the substrate 1. Subsequently, the diaphragm 2 having the conductor lead layers 7 and the thick ceramic layer 9 formed thereon is provided in its periphery with an unsintered ceramic paste containing an organic binder. The diaphragm 2 is superposed on the substrate 1 before the paste dries up. Thereafter, the assembly is heated to remove the resin content and then sintered to form an integral assembly, as shown in FIG. 19. After producing the sintered assembly, resistors 8, which are primarily made of ruthenium oxide, are formed having a thickness of 5-10 μm by pattern transfer in desired positions between conductor lead layers 7 as shown in FIG. 20. The resistors 8 are then baked at 850° C.

As described above, the pressure sensor of the present invention is characterized in that a diaphragm made of an unsintered ceramic material and a substrate made of an unsintered ceramic material having a larger factor of shrinkage upon sintering than the diaphragm, are bonded in their peripheral portions and integrally assembled by sintering. Hence, a desired hollow space can be formed between the diaphragm and the substrate without using expensive inserts as in the prior art. Further, a compensating thick ceramic layer which is capable of adjusting the factor of shrinkage upon sintering is superposed on either the diaphragm or the substrate or both, so even when the diaphragm and the substrate are made of ceramic materials having fixed factors of shrinkage upon sintering, fine adjustments of their shrinkage factors can be accomplished over a fairly broad range by properly adjusting the thickness of the compensating thick layer. As a result, hollow spaces of desired dimensions can be easily formed. Thus, pressure sensors can be manufactured using a greatly simplified process at a substantially reduced cost.

The substrate and the diaphragm superposed thereon, have the same structure in the adjoining portions so that the resulting joint is sufficiently strong to prevent its bonding strength from decreasing upon thermal expansion. Even if the pressure sensor is used under such hostile conditions as may occur in proximity to an automobile engine, the differences in thermal expansion that would otherwise develop in the joint can be eliminated to insure reliable and consistent pressure detection without causing unwanted deformations in the absence of applied pressure.

If desired, a protective layer may be provided on the diaphragm which permits the pressure sensor to be used consistently over an extended period by preventing the pressure sensing elements from being contaminated or deteriorated by contaminants.

In the embodiments described above, $Al_2O_3$ is used as the constituent material of the substrate and the diaphragm but it should be noted that they can be made of any other suitable unsintered ceramic materials such as zirconia and sillimanite.

It should also be noted that the individual components of the pressure sensors shown in FIGS. 1-20 may be formed having any desired dimensions or shape in accordance with the specific application in practice.

The pressure sensor of the present invention has been described above with particular reference being made to a type of pressure sensor that detects applied pressure as a function of the resulting deformation of the diaphragm. It should, however, be noted that the sensor can also be used to detect the magnitude of vibrations and acceleration on the basis of the deformation that occurs in the diaphragm under the resulting stress.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pressure sensor, comprising:
a ceramic substrate formed from a first unsintered ceramic material;
a diaphragm capable of deformation under pressure, and formed of a second unsintered ceramic material having a factor of shrinkage upon sintering small than that of the first material, wherein said diaphragm is fixed to the periphery of a surface of said ceramic substrate to form an integral assembly having a hollow space formed therebetween upon sintering due to the difference in the factor of shrinkage of the first and second materials; and
pressure sensing means for sensing pressure variations based on the deformation of said diaphragm.

2. A pressure sensor, comprising:
a ceramic substrate formed from a first unsintered ceramic material;
a diaphragm capable of deformation under pressure, and formed of a second unsintered ceramic material having a factor of shrinkage upon sintering smaller than that of the first material, wherein said diaphragm is fixed to the periphery of a surface of said ceramic substrate to form an integral assembly having a hollow space formed therebetween upon sintering due to the difference in the factor of shrinkage of the first and second materials;
a first electrode formed on a surface of said ceramic substrate which faces said diaphragm; and
a second electrode formed on said diaphragm in opposition to said first electrode.

3. The pressure sensor of claim 2, wherein said second electrode is formed on an inside surface of said diaphragm which faces said ceramic substrate.

4. The pressure sensor of claim 2, wherein said second electrode is formed on an outside surface of said diaphragm.

5. The pressure sensor of claim 4, further comprising a protective layer formed over said second electrode and the outer surface of said diaphragm.

6. A pressure sensor, comprising:
a ceramic substrate formed from a first unsintered ceramic material;
a diaphragm capable of deformation under pressure, and formed of a second unsintered ceramic material having a factor of shrinkage upon sintering smaller than that of the first material, wherein said diaphragm is fixed to the periphery of a surface of said ceramic substrate to form an integral assembly having a hollow space formed therebetween upon sintering due to the difference in the factor of shrinkage of the first and second materials; and
a resistor formed on an outer surface of said diaphragm, wherein the resistance of said resistor varies upon being distorted.

7. The pressure sensor of claim 6, further comprising a protective layer formed over said resistor and the outer surface of said diaphragm.

8. A pressure sensor, comprising:
a ceramic substrate formed from a first unsintered ceramic material;
a diaphragm capable of deformation under pressure, and formed of a second unsintered ceramic material having a factor of shrinkage upon sintering smaller than that of the first material, wherein said diaphragm is fixed to the periphery of a surface of said ceramic substrate to form an integral assembly having a hollow space formed therebetween upon sintering due to the difference in the factor of shrinkage of the first and second materials;
pressure sensing means, formed on an outer surface of said diaphragm, for sensing pressure variations based on the deformation of said diaphragm; and
a protective layer formed over said pressure sensing means and the outer surface of said diaphragm.

9. A pressure sensor, comprising:
a ceramic substrate formed from a first unsintered ceramic material;
a diaphragm capable of deformation under pressure, and formed of a second unsintered ceramic material having a factor of shrinkage upon sintering smaller than that of the first material, wherein said diaphragm is fixed to the periphery of a surface of said ceramic substrate to form an integral assembly having a hollow space formed therebetween upon sintering due to the difference in the factor of shrinkage of the first and second materials;
pressure sensing means for sensing pressure variations based on the deformation of said diaphragm; and
compensating means, formed between said ceramic substrate and said diaphragm, for adjusting the difference in the factor of shrinkage between said diaphragm and said ceramic substrate.

10. The pressure sensor of claim 9, wherein said compensating means comprises a layer formed from a third unsintered ceramic material.

11. The pressure sensor of claim 10, wherein the third unsintered ceramic material has a factor of shrinkage upon sintering that is in between the factors of shrinkage of the first and second materials.

12. The pressure sensor of claim 9, wherein said pressure sensing means comprises:
   a first electrode formed on a surface of said ceramic substrate which faces said diaphragm; and
   a second electrode formed on said diaphragm in opposition to said first electrode.

13. The pressure sensor of claim 12, wherein said second electrode is formed on an inside surface of said diaphragm which faces said ceramic substrate.

14. The pressure sensor of claim 13, wherein said second electrode is formed on said compensating means.

15. The pressure sensor of claim 12, wherein said second electrode is formed on an outside surface of said diaphragm.

16. The pressure sensor of claim 15, further comprising a protective layer formed over said second electrode and the outer surface of said diaphragm.

17. The pressure sensor of claim 15, wherein said compensating means is formed on an inside surface of said diaphragm which faces said ceramic substrate.

18. The pressure sensor of claim 17, further comprising a protective layer formed over said second electrode and the outer surface of said diaphragm.

19. The pressure sensor of claim 12, wherein said compensating means is formed on an inside surface of said diaphragm which faces said ceramic substrate.

20. The pressure sensor of claim 19, wherein said second electrode is formed on said compensating means.

21. The pressure sensor of claim 12, wherein said compensating means is formed over said first electrode and an inside surface of said ceramic substrate.

22. The pressure sensor of claim 21, wherein said second electrode is formed on an inside surface of said diaphragm which faces said ceramic substrate.

23. The pressure sensor of claim 9, wherein said pressure sensing means comprises a resistor formed on the outer surface of said diaphragm, wherein the resistance of said resistor varies upon being distorted.

24. The pressure sensor of claim 23, further comprising a protective layer formed over said resistor and the outer surface of said diaphragm.

25. The pressure sensor of claim 9, further comprising warping preventing means, formed on a surface of said ceramic substrate, for preventing the pressure sensor from warping.

* * * * *

UNITED STATES PATENT AND TRADEMARK OFFICE
CERTIFICATE OF CORRECTION

PATENT NO. : 5,189,916
DATED : March 02, 1993
INVENTOR(S) : Katsuyoshi Mizmoto et al.

It is certified that error appears in the above-indentified patent and that said Letters Patent is hereby corrected as shown below:

Claim 1, column 9, line 50, change "small"
to --smaller--.

Signed and Sealed this

Twenty-fifth Day of January, 1994

Attest:

BRUCE LEHMAN

*Attesting Officer*      *Commissioner of Patents and Trademarks*